April 23, 1940.  F. MORELLA  2,198,314
PULLEY FOR SPEED-CHANGING MECHANISMS
Filed March 15, 1939
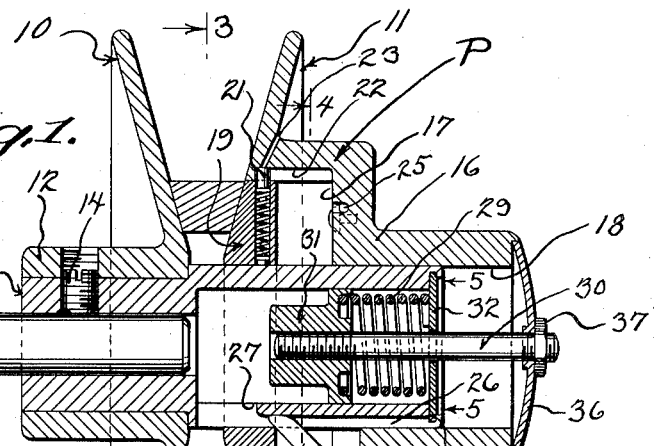
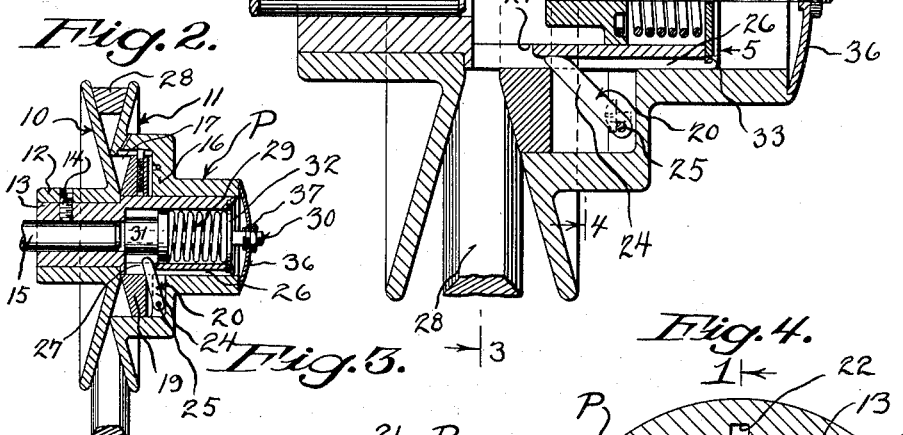
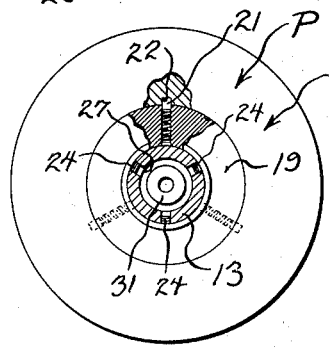
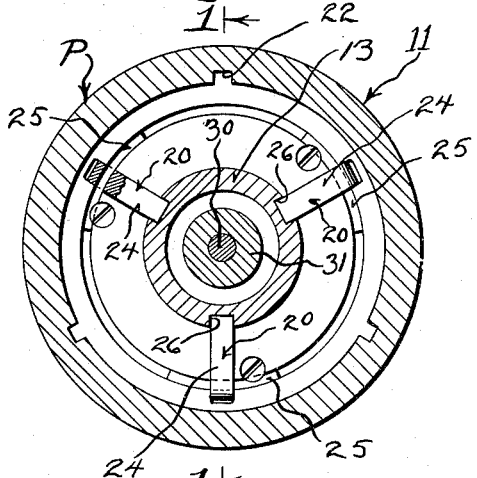
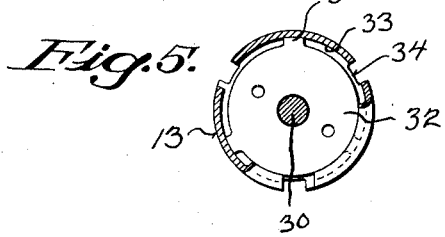
Inventor
F. Morella
By
Attorneys Patented Apr. 23, 1940

2,198,314

UNITED STATES PATENT OFFICE 2,198,314

PULLEY FOR SPEED-CHANGING MECHANISMS

Frank Morella, Milwaukee, Wis., assignor of one-fourth to H. C. Bennallack, Milwaukee, Wis.

Application March 15, 1939, Serial No. 261,892

5 Claims. (Cl. 74—230.17)

This invention appertains to pulleys, and is an improvement on my prior application Serial No. 211,737, filed June 4, 1938.

One of the primary objects of my present invention is to provide a pulley in which the active diameter thereof can be readily changed so as to obtain a desired increase or decrease in speed, as may be desired, in a driven part.

Another salient object of my invention is to provide an improved pulley embodying companion sections, one of which is movable toward and away from the other and provided with a displaceable hub portion, whereby to permit of the maximum collapsing of the pulley when necessary.

A further important object of my invention is to provide means for automatically holding the collapsible hub portion against accidental inward movement when the pulley sections are in their normal spaced-apart condition, so as to insure smooth pulley section faces, and thereby prevent undue wear on the pulley belt.

A still further object of my invention is to provide means for automatically releasing the displaceable hub portion when the pulley sections are moved into engagement with one another for permitting the collapsing of the pulley.

A still further important object of my invention is to generally improve and simplify pulleys of the type shown in my allowed application above identified.

With these and other objects in view, the invention consists in the novel construction, arrangement, and formation of parts, as will be hereinafter more specifically described, claimed, and illustrated in the accompanying drawing, in which drawing:

Figure 1 is a central sectional view through my improved pulley, showing the same in its expanded condition for permitting the positioning of the pulley belt close to the hub of the pulley.

Figure 2 is a view similar to Figure 1 on a smaller scale, showing the pulley in its collapsed position, so as to dispose the pulley belt adjacent the periphery of the pulley.

Figure 3 is a detail sectional view taken on the line 3—3 of Figure 1, looking in the direction of the arrows, illustrating the pulley section with the displaceable hub portion, the view being taken on the same scale as Figure 2.

Figure 4 is a detail sectional view taken on the line 4—4 of Figure 1, looking in the direction of the arrows, illustrating the means for automatically holding the displaceable hub portion against inward movement, the view being taken on the same scale as Figure 1.

Figure 5 is a detail sectional view taken on the line 5—5 of Figure 1, looking in the direction of the arrows, illustrating the spring holding plate.

Referring to the drawing in detail, wherein similar reference characters designate corresponding parts throughout the several views, the letter P generally indicates my improved pulley, and the same comprises companion pulley sections 10 and 11. The pulley section 10 includes an outwardly extending, axially disposed hub sleeve in which is fitted a hollow shaft 13. This hollow shaft 13 can be rigidly secured to a drive or driven shaft (as the case may be) in any desired manner, such as through the use of a set screw 14. As illustrated, the set screw 14 extends through the hub sleeve 12 and the hollow shaft 13 for engaging the solid shaft 15.

The pulley section 11 is slidably mounted upon the hollow shaft 13 and is, thus, movable toward and away from the pulley section 10. If preferred, a bearing bushing (not shown) can be interposed between the hollow shaft 13 and the movable pulley section 11, so as to reduce friction between these parts and to prevent the binding of the pulley section 11 upon the hollow shaft.

The pulley is adapted to receive a V-shaped pulley belt, that is, a pulley belt of trapezoidal shape in cross section, and the inner faces of the pulley sections 10 and 11 are of the same inclination and at an angle best suited for the purpose intended.

The pulley section 11 is axially enlarged, as at 16, so as to form a centrally disposed chamber 17, and the axial bore 18 for receiving the hollow shaft 13. The chamber 17 slidably receives the displaceable hub portion 19 of the pulley section 11. The outer face of the hub portion 19 has the same angle of inclination as the inner faces of the sections 10 and 11, and the hub portion 19 is normally held against inward movement in the chamber 17, by novel means 20, which will be later set forth.

It is to be noted that outward movement of the hub portion 19 beyond a predetermined limit is prevented by pins 21, which are carried by the hub portion 19 and slidably mounted in guideways 22 formed in the annular wall of the chamber 17. These pins 21, likewise, prevent turning movement of the hub portion 19 and also prevent tilting of the hub portion and insure the proper sliding of the hub portion back and forth. The pins 21 can be mounted in the hub portion 19 in any preferred manner, and, for the purpose of illustration, I have shown the pins 21 spring-pressed, so that the pins can be collapsed to facilitate the assembling of the hub portion 19 with its pulley section 11. When the pins are to be disconnected, a nail, pin, or the like can be inserted through the ways 23 for pushing the pins back against their springs and out of the guideways 22. Obviously, when this is done, the hub portion 19 can be instantly removed.

The means 20 for automatically holding the hub portion 19 against accidental collapsing movement includes a plurality of holding levers 24. These levers 24 are pivoted at their outer ends on pivot pins 25 secured to the walls of the chamber 17. The inner ends of the levers 24 are preferably curved and are slidably mounted in longitudinally extending guideways 26 formed in the outer face of the hollow shaft 13. The hollow shaft 13 adjacent the pulley section 10 is provided with slots 27 which communicate with the guide grooves 26.

As is clearly shown in Figure 1, the inner face of the hub portion 19 rests against the inner ends of the levers 24, and pressure on the hub portion 19 will be transmitted to the inner ends of the levers 24, and these ends will merely press against the hollow shaft 13, and the hub portion 19 will be firmly held against movement. As the section 11 is moved toward the section 10 and when the section 10 engages the hub portion 19, the inner ends of the levers 24 will ride into the slots 27, and, thus, the levers will be free to rock on their pivot pins 25. Consequently, as the pulley sections come together the pulley section 10 can force back the hub portion 19 into the chamber 17 until the hub portion is pressed entirely into the chamber.

By this construction and arrangement, smooth inner pulley section faces for the pulley belt 28 are insured, and, thus, undue wear on the pulley belt is prevented. When the pulley belt engages the hub portion 19, the pulley belt will be prevented from forcing the hub portion into the chamber 17 by the levers 24. However, as the belt rides toward the periphery of the pulley, the pulley sections can collapse toward one another and the hub portion will be collapsed, as is clearly shown in Figure 2. Normally, the pulley sections 10 and 11 are firmly urged toward one another into the collapsed position shown in Figure 2 of the drawing.

The means for urging the pulley sections toward one another may comprise an expansion coil spring 29, which is fitted about a spring-retaining rod 30. This spring-retaining rod has threaded on its inner end a spring-retaining nut 31, and the nut, the spring, and the inner end of the rod are received within the hollow shaft 13. A spring-holding plate 32 is slidably mounted upon the rod 30 and is detachably connected with the hollow shaft 13. Naturally, the plate 32 can be associated with the hollow shaft in different manners, and, as illustrated in Figures 1 and 3, the hollow shaft has an internal annular groove 33, and communicating with this groove are short entrance slots 34. The disc 32 is provided with radial lugs 35, and in placing the disc 32 in position, the lugs 35 are alined with the ways 34, and by pushing in on the disc 32 the lugs 35 can be moved into alinement with the groove 33, after which the disc or plate 32 can be rotated so as to position the lugs 35 in the groove 33.

The outer end of the rod 30 extends through a concavo-convex disc 36, which fits against the extension 16 of the pulley section 11 and closes the bore 18 thereof. A holding nut 37 is threaded on the rod into engagement with the disc 36. Thus, the spring 29 functions to pull the pulley section 11 toward the pulley section 10.

In use of my improved pulley, the belt is normally disposed adjacent the periphery of the pulley, as shown in Figure 2. By increasing the tension on the pulley, the pulley sections 10 and 11 can be gradually separated, and this will bring about the desired change of speed. The inward pull on the belt can be continued until the belt occupies a position shown in Figure 1. As the hub portion 19 is prevented from moving inwardly, full bearing surface is assured for the belt. If preferred, mechanical means can be provided for shifting the section 11 on the hollow shaft.

Other changes in details may be made without departing from the spirit or the scope of my invention, but what I claim as new is:

1. A pulley for speed-changing mechanisms comprising, a pair of companion pulley sections, a shaft carried by one of said pulley sections, the other of said pulley sections being slidably mounted upon the shaft and provided with an axially disposed chamber, a hub portion slidably mounted in the chamber, means limiting the outward movement of the hub portion, levers pivotally secured to the last-mentioned pulley section having their ends resting upon the shaft and in engagement with the hub portion for normally holding the hub portion against inward movement, said shaft having openings therein for receiving the inner ends of the levers when the pulley sections reach a predetermined position relative to one another, as and for the purpose specified.

2. A pulley for speed-changing mechanisms comprising, a pair of companion sections, an inwardly directed hollow shaft carried by one of the sections, the other of said sections being slidably mounted on the hollow shaft and movable toward and away from the other section, and means normally urging the sections toward one another including an expansion spring arranged within the hollow shaft, a hanger rod extending through the spring, means on the rod for engaging the inner end of the spring, a plate engaging the outer end of the spring slidably mounted on the rod engaging the hollow shaft, a supporting plate engaging the hub of the last-mentioned pulley section, and means detachably connecting the rod to said plate.

3. A pulley for speed-changing mechanisms comprising, a pair of companion sections, an inwardly directed hollow shaft carried by one of the sections, the other of said sections being slidably mounted on the hollow shaft and movable toward and away from the other section, means normally urging the sections toward one another including an expansion spring arranged within the hollow shaft, a hanger rod extending through the spring, means on the rod for engaging the inner end of the spring, a plate engaging the outer end of the spring slidably mounted on the rod engaging the hollow shaft, a supporting plate engaging the hub of the last-mentioned pulley section, means detachably connecting the rod to said plate, said last-mentioned section including a displaceable hub portion, means for limiting the outward movement of the hub portion, and releasable means for normally holding the hub portion against inward movement when the sections are separated.

4. A pulley for speed-changing mechanisms comprising, a pair of companion pulley sections, a shaft carried by one of said pulley sections, the other of said pulley sections being slidably mounted upon the shaft and having an internal, axially disposed chamber, a hub portion slidably mounted in the chamber, means limiting the outward movement of the hub portion, including spring-pressed drive pins extending radially from the hub portion, and the outer wall of said axially disposed chamber having slots therein slidably receiving the outer ends of the spring-pressed pins, said slots terminating short of the inner end of the chamber, levers pivotally secured to the last-mentioned pulley section having their ends resting upon the shaft and in engagement with the hub portion for normally holding the hub portion against inward movement, said shaft having openings therein for receiving the inner ends of the levers when the pulley sections reach a predetermined position relative to one another.

5. A pulley for speed-changing mechanisms comprising, a pair of companion pulley sections, a shaft carried by one of said pulley sections, the other of said pulley sections being slidably mounted upon the shaft and provided with an axially disposed chamber, a hub portion slidably mounted in the chamber and on the shaft, said shaft having longitudinally extending grooves, means limiting the outward movement of the hub portion, levers pivotally secured to the last-mentioned pulley section having their inner ends resting against the walls of the grooves in the shaft and in engagement with the inner face of the hub portion for normally holding the hub portion against inward movement, said shaft having openings therein communicating with the inner ends of the grooves for receiving the inner ends of the levers when the pulley sections reach a predetermined position relative to one another.

FRANK MORELLA.